Patented Oct. 24, 1933

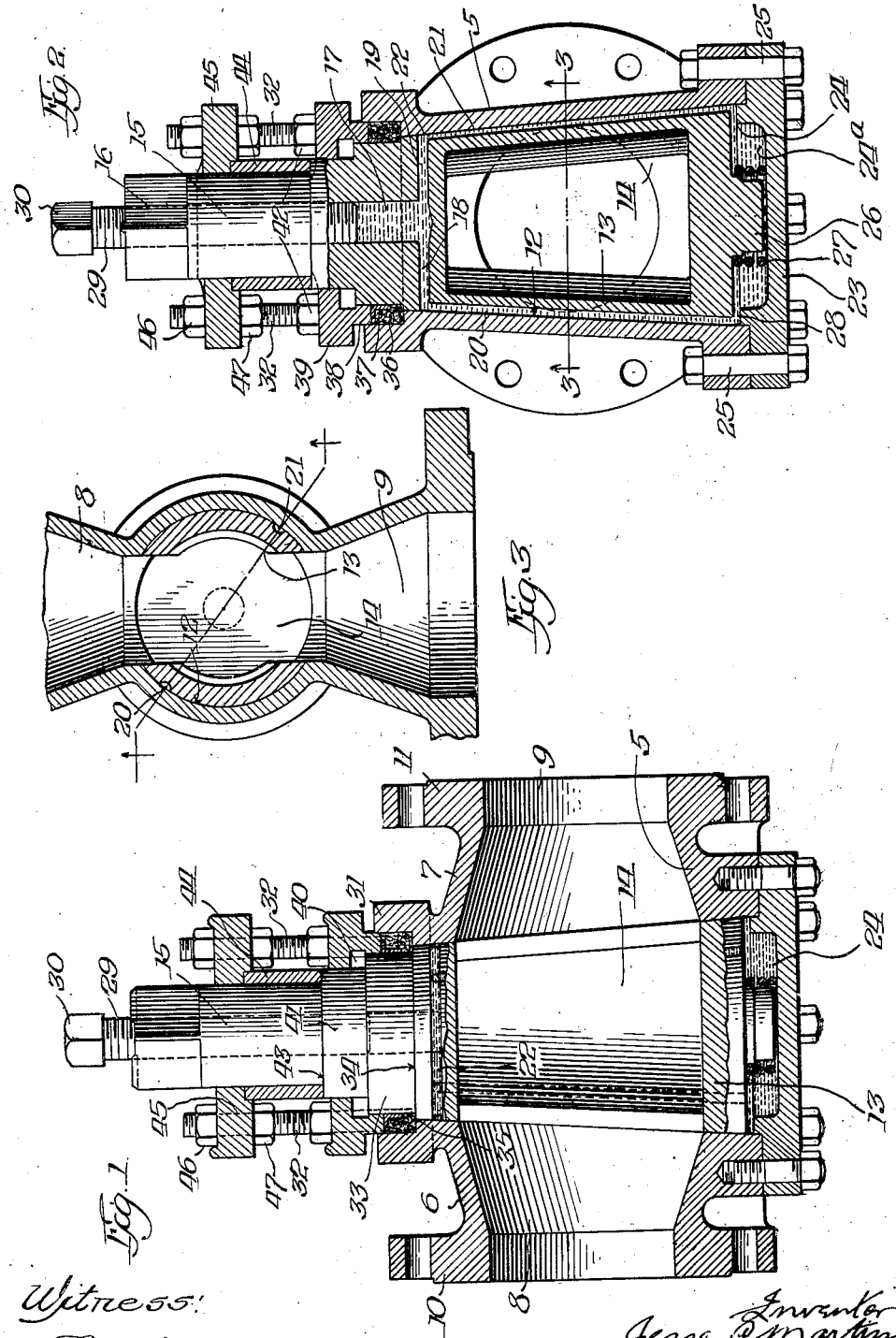

1,931,898

UNITED STATES PATENT OFFICE 1,931,898

LUBRICATED INSULATED PLUG VALVE

Jesse C. Martin, Jr., San Francisco, Calif., assignor to Walworth Patents Inc., Boston, Mass., a corporation of Massachusetts Application January 26, 1927. Serial No. 163,597

5 Claims. (Cl. 251—93)

This invention relates in general to valves, and more particularly to improvements in plug valves, that is, valves having a casing and a rotatable plug member therein which controls the flow of fluid in a pipe line, the present invention more particularly relating to improved means for lubricating such valves to prevent sticking of the plug member due to corrosion, or other deterioration of the valve and seat or other relatively movable parts.

While the invention is particularly adapted to employment in a valve such as shown, and described herein, it will be understood that the invention finds a wide field of utility for other analogous purposes.

This invention has as one of its principal objects the provision of a valve of the character referred to for use in pipe lines conducting caustic or other corrosive liquors or fluids such as are encountered in conveying boric acid and caustic soda solutions as well as acid liquors.

I have found that in practical use of plug valves such as that shown in my Patent No. 1,416,732 and others, that there is a tendency for the valve to freeze or stick, owing to the corrosive action of the fluids passing therethrough and particularly that the resilient means, where employed, such as a coil spring or the like employed for tending to hold the valve on its seat, is subject to rapid deterioration owing to contact with such fluids.

This invention has as its objects the provision of a valve in which the plug member is substantially entirely surrounded by a film of lubricant; the provision of an improved plug valve in which a lubricant is applied under pressure to the valve to tend to balance it by imposing a pressure on one end thereof and along the sides thereof for insulating the valve surface and the seat as well as other vital working parts against contact with fluids flowing through the valve; the provision in an improved plug valve of means for applying pressure to one end of the valve tending to seat the same and of means preventing wedging of the valve in its seat; the provision of an improved plug valve having means for applying pressure of a lubricant thereto for tending to hold the valve on its seat and also lubricating the valve, together with adjustable means for preventing wedging of the valve on its seat; and the invention includes other features of novelty and usefulness which will appear as this description proceeds.

The foregoing and such other objects and advantages possessed by the valve of this invention are attained in the structural embodiment illustrated in the accompanying drawing in which:

Figure 1 is a vertical sectional view of a valve embodying the improvements of this invention.

Figure 2 is a view similar to Figure 1, taken on the plane of the line 2—2 of Figure 1, and Figure 3 is a transverse sectional view taken on the line 3—3 of Figure 2 looking in the direction indicated by the arrows.

Referring more particularly to the drawing, I provide a casing 5, said casing having lateral integral extensions 6 and 7 provided with inlet and outlet ports 8 and 9 and annular flanges 10 and 11 apertured for suitably securing the valve in a pipe line.

The casing 5 is provided between the inlet and outlet ports with a valve seat 12 which, from the nature of the valve structure, is preferably generally tapering and receives a plug valve member 13 of a similar configuration having a surface which engages the seat 12. The valve member 13 is provided with a transverse passageway 14 which, when brought into registration with the ports 8 and 9, permits the flow of fluids in the usual manner.

It will be observed that the medial portion of the casing 5 forming the valve seat 12 is open at the top and bottom, that is, at both ends, and the valve member is inserted from one end of the seat and secured in position in the manner which will hereinafter appear.

The valve member is provided with a valve stem 15 projecting beyond the upper end of the casing and beyond the retaining elements and formed with a portion 16 for receiving a suitable means for rotating the valve.

The valve member is further provided with a lubricant receptacle 17 extending axially through the valve stem and communicating with transverse passageways 18 and 19 which supply lubricant from said chamber to diametrically oppositely located lubricant channels 20 and 21 which are formed in the surface of contact between the plug valve member and its seat, that is, these channels are formed either in the face of the valve itself or in the valve seat. Such construction is permitted owing to the provision of an annular channel 22 near the top of the plug member, as shown in Figure 1, so that whether the channels 20 and 21 are placed in the valve member or in the seat, the lubricant will reach these channels. Upon reference to Figure 3 it will be observed that the channels 20 and 21 are preferably so disposed that they will always be in contact with the valve seat 12 and thus prevent escape of the lubricant from such channels into the pipe line.

The lower end of the medial portion of the valve casing is closed by a plate member 23 formed below the point 24 with a lubricant chamber 24a and retained in position on the casing 5 by the provision of bolts and nuts 25, 25 passing through complemental flanges on the plate member 23 and casing.

The lower end of the plug valve member is provided with a projection 26 for receiving a helical spring 27 tending to hold the valve on its seat, that is, as viewed in Figures 1 and 2, tending to push the valve member upwardly.

In practice some valves have been provided with a passageway which permitted the liquids in the line to reach the chamber 24 for tending to hold the valve on its seat and even though this were not provided the liquids, especially those of a caustic or acid nature, generally reach the chamber 24 and remain in this chamber tending to destroy the effectiveness of the spring 27 or to solidify in the chamber and prevent the valve from operating properly. In the present invention I extend the channels 20 and 21 to the bottom of the valve member so that they communicate as indicated at 28, with the chamber 24. Thus a lubricant, such as indicated in Figure 2, placed in the receptacle 17, can reach the chamber 24 when placed under pressure.

For placing the lubricant under pressure, I provide a screw 29 having a suitable head 30 for receiving a wrench or other tool, and said screw is threaded into the receptacle 17 so that right hand rotation of the screw will place pressure on the lubricant in the receptacle 17 and force it down through the channels 12 into the lubricant chamber 24, the pressure against this larger end of the valve tending to lift it and force it against its seat. It is obvious that without some other means for preventing wedging, this action of the lubricant will wedge the valve against its seat, and at least considerably interfere with rotation of the plug member if not prevent such rotation entirely. However, to prevent such wedging of the valve on its seat, I provide adjustable structure which is placed at the opposite end, that is, the smaller end of the plug member on the casing, for providing a limit stop as well as a packing so that the valve may be nicely adjustable to insure that it will be fluid-tight and properly lubricated and freely rotatable in operation.

For the purpose just described I provide an annular flange 31 at the upper portion of the casing 5 surrounding the plug member where it projects from the casing, and a plurality of studs 32 project into said flange, these studs being arranged at suitably spaced points around the periphery of said flange and extending along the stem 15 of the valve.

The valve member is first reduced in diameter, as at 33, to form an annular shoulder 34 and, similarly, the flange 31 is provided with an annular recess 35, said flange and recess cooperating to receive a soft packing 36 having an annular metallic sleeve 37 for protecting the packing against mutilation when the flange 38 of the packing gland 39 compresses the same.

The packing gland 39 is annularly recessed, as at 40, to prevent jamming on the top of the reduced portion 33 of the valve.

The valve member is further reduced, as at 41, and the packing gland snugly engages the reduced portion 41 so as to guide and reinforce said flange in use.

The studs 32 are threaded throughout their lengths and receive nuts 42 which may be tightened down on to the top of the gland 39 for compressing the packing to the desired degree.

The reduced portion 41 is slightly larger than the stem 15 so as to afford an annular shoulder 43, and the stem receives a sleeve 44 which seats on said shoulder 43. This sleeve is actuated into proper position by the thrust plate 45 apertured to snugly engage the stem 15 and to suitably receive the upper ends of the studs 32. This thrust plate is actuated into position and retained in such position by the complemental nuts 46 and 47, respectively, carried on said studs. It is believed to be obvious how the nuts 46 and 47 can adjust the plate 45 along the stem and thus limit the degree of upward movement of the valve in response to the pressure of the lubricant in the chamber 24 and thus prevent wedging of the valve in its seat.

It will, therefore, be seen that in the present invention the valve is substantially surrounded, where it is subjected to the fluids controlled, with a film of grease or other lubricant thereby preventing actual contact of the fluids conducted with the valve seat or the surface of the valve contacting therewith or with the spring in the chamber 24, thereby insuring that the valve not only is properly lubricated to facilitate its operation but that its parts, vital to its proper operation, are insulated from the deteriorating effects of any acid or caustic solutions conducted through the valve and thereby the life of the valve is materially lengthened.

Having thus described my invention and illustrated its use, what I claim as new and desire to secure by Letters Patent is:

1. A plug valve comprising, in combination, a casing having a tapered seat and a lubricant chamber at the larger end of the seat, a rotatable tapered plug valve member seated in said seat and having a lubricant receptacle therein, a packing at the smaller end of said plug valve member, the seating surface of said valve member and casing being provided with lubricant conveying channels extending between said lubricant chamber and said receptacle, means for placing the lubricant in said receptacle under pressure and thereby exerting pressure on the larger end of said plug valve member, and a limit stop for preventing crushing of said packing and the wedging of said valve member in said seat when pressure is established in said chamber.

2. In a valve, a casing having a tapered seat, a tapered valve member in said casing adapted to engage said seat, a resilient support for the valve member, a lubricant chamber at the larger end of the valve member for containing a lubricant, means for applying pressure to the lubricant in said chamber tending to hold the valve member on its seat and for lubricating the valve member and a compressible and adjustable packing at the smaller end of the valve member for preventing leakage and wedging of the valve member on its seat due to such lubricant pressure.

3. In a valve, a casing having a tapered seat and a lubricant chamber at the larger end of said seat, a tapered valve member engaging said seat, resilient means tending to hold said valve on its seat, grooves in the seating surfaces of the valve and its seat for conducting lubricant thereto, means for placing lubricant in said grooves under pressure, said grooves forming direct communication with said lubricant chamber so as to supply lubricant under pressure from said grooves to said chamber for tending to hold said valve member on its seat.

4. In a valve, a casing having a tapered seat and a lubricant chamber at the larger end of said seat, a tapered valve member engaging said seat, resilient means tending to hold said valve on its seat, grooves in the seating surfaces of the valve and its seat for conducting lubricant thereto, means for placing lubricant in said grooves under pressure, said grooves forming direct uninterrupted communication with said lubricant chamber so as to supply lubricant under pressure from said grooves to said chamber for tending to hold said valve member on its seat.

5. In a valve, a casing having a tapered seat, a tapered valve member in said casing adapted to engage said seat, resilient means tending to keep said valve on its seat, a lubricant chamber at the larger end of said seat for containing a lubricant, lubricant channels in the surface of contact of the plug and seat directly communicating with said chamber, means for applying pressure to the lubricant in said channels and thence said chamber, and thereby tending to move the valve member towards its seat, and means located adjacent the small end of the seat for preventing wedging of the valve in its seat by the action of the resilient means and lubricant, so that said valve member may be balanced between said last mentioned means and said resilient means.

JESSE C. MARTIN, Jr.